(No Model.) 4 Sheets—Sheet 1.
B. F. STOCKFORD.
SPEED AND WHISTLE RECORDER FOR LOCOMOTIVE ENGINES.
No. 482,393. Patented Sept. 13, 1892.

Witnesses,

Inventor,
Benjamin F. Stockford
By Darton & Brown
Attys.

(No Model.) 4 Sheets—Sheet 2.
B. F. STOCKFORD.
SPEED AND WHISTLE RECORDER FOR LOCOMOTIVE ENGINES.
No. 482,393. Patented Sept. 13, 1892.
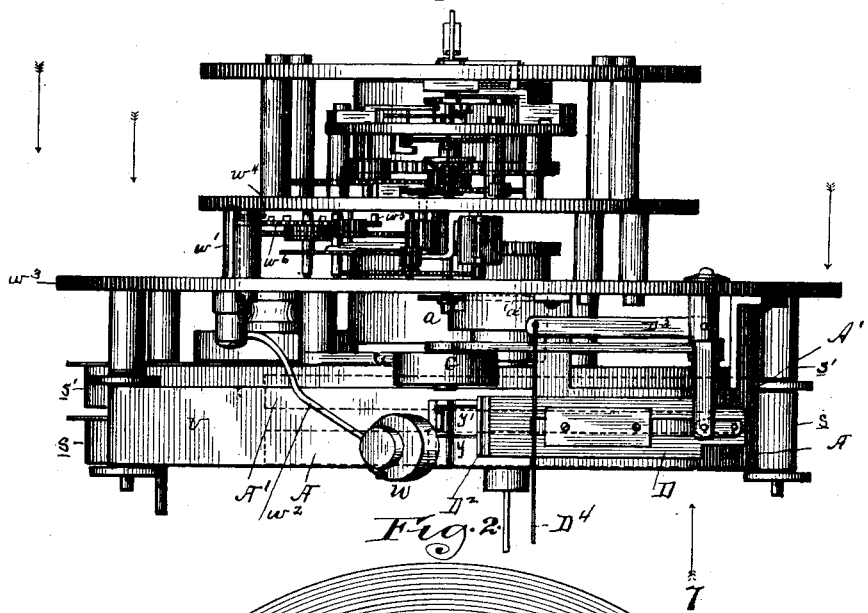
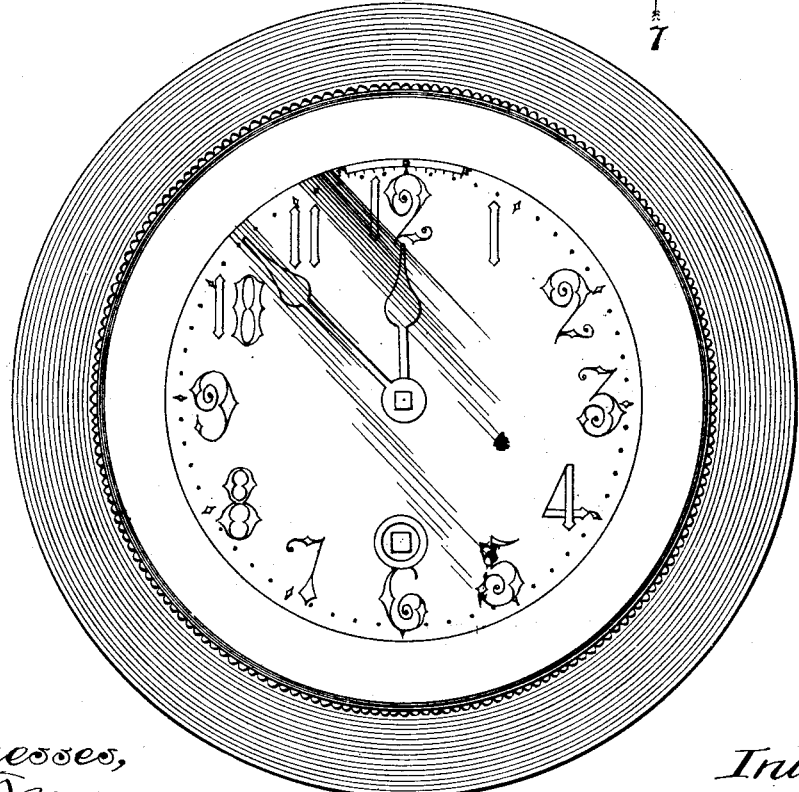
Witnesses,
Inventor,
Benjamin F. Stockford
By Barton & Brown
Attys.

(No Model.)  4 Sheets—Sheet 3.

B. F. STOCKFORD.
SPEED AND WHISTLE RECORDER FOR LOCOMOTIVE ENGINES.

No. 482,393.  Patented Sept. 13, 1892.

Witnesses:
George L. Cragg.
George McMahon.

Inventor:
Benjamin F. Stockford.
By Barton & Brown
att'ys.

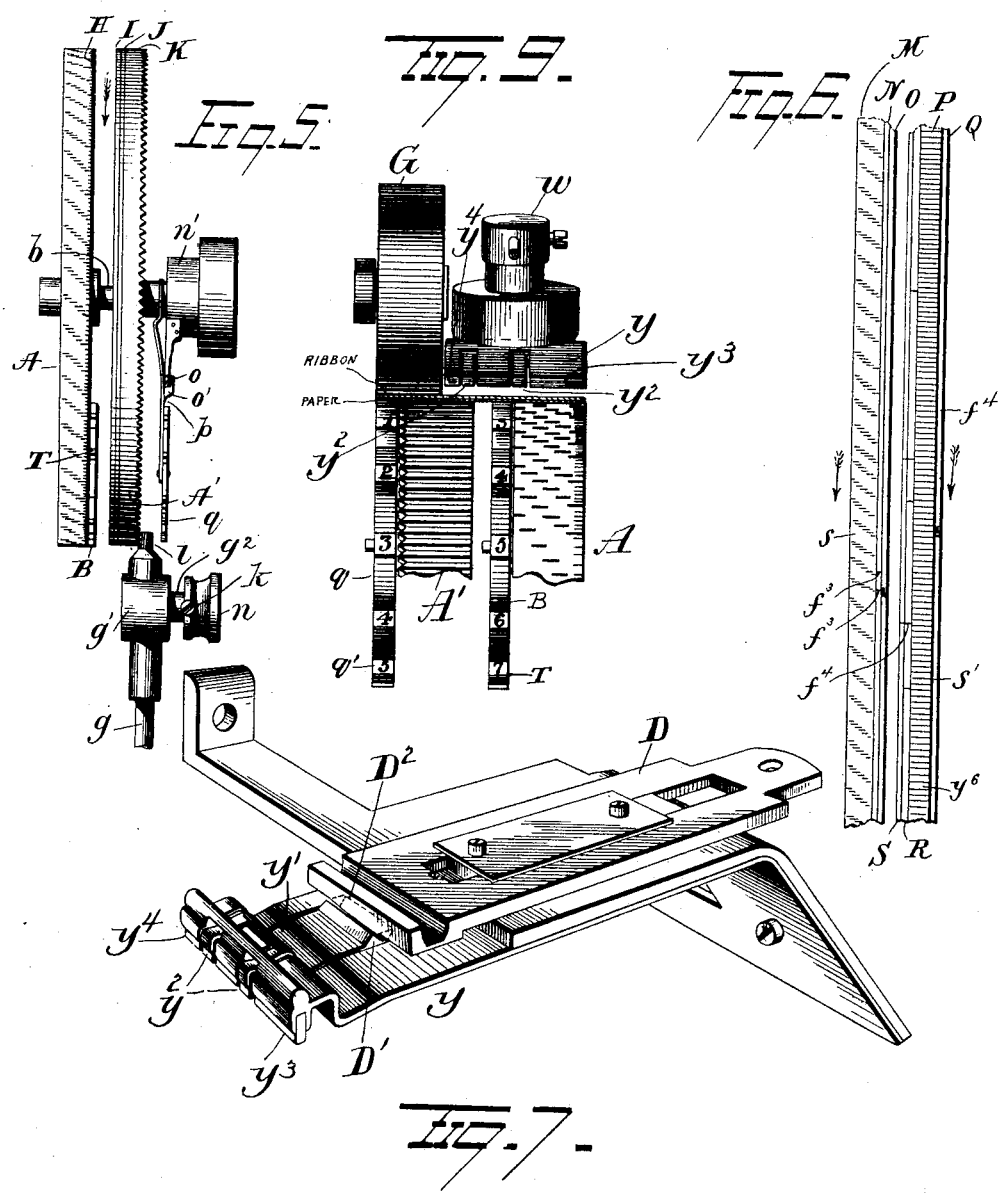

UNITED STATES PATENT OFFICE.

BENJAMIN F. STOCKFORD, OF SOUTH BEND, INDIANA.

SPEED AND WHISTLE RECORDER FOR LOCOMOTIVE-ENGINES.

SPECIFICATION forming part of Letters Patent No. 482,393, dated September 13, 1892.

Application filed August 17, 1891. Serial No. 402,884. (No model.)

*To all whom it may concern:*

Be it known that I, BENJAMIN F. STOCKFORD, a citizen of the United States, residing at South Bend, in the county of St. Joseph and State of Indiana, have invented a certain new and useful Improvement in Speed and Whistle Recorders for Locomotive-Engines, of which the following is a full, clear, concise, and exact description, reference being had to the accompanying drawings, forming a part of this specification.

My invention relates to indicators for locomotives, and has for its object to provide means for recording permanently the exact time the whistle was blown.

A further object is to construct a recorder or indicator in such a manner that when the whistle is blown a record will be made upon a strip of paper, such record indicating the hour and minute the whistle was sounded and the distance traveled by the train while the whistle was blowing, so that if in case of accident or any other reason it may be desired the exact time of day or night and the exact locality on the road at which the whistle is blown may be known by referring to the record.

A further object is to produce an indicator by means of which the length of time a train stands still at any given part of the road may be automatically recorded.

A further object is to produce a device which will indicate the rate of speed traveled throughout the entire run.

With these objects in view my invention consists in certain novel features of construction and combinations of parts, as will be more fully described, and pointed out in the claims.

Figure 1:
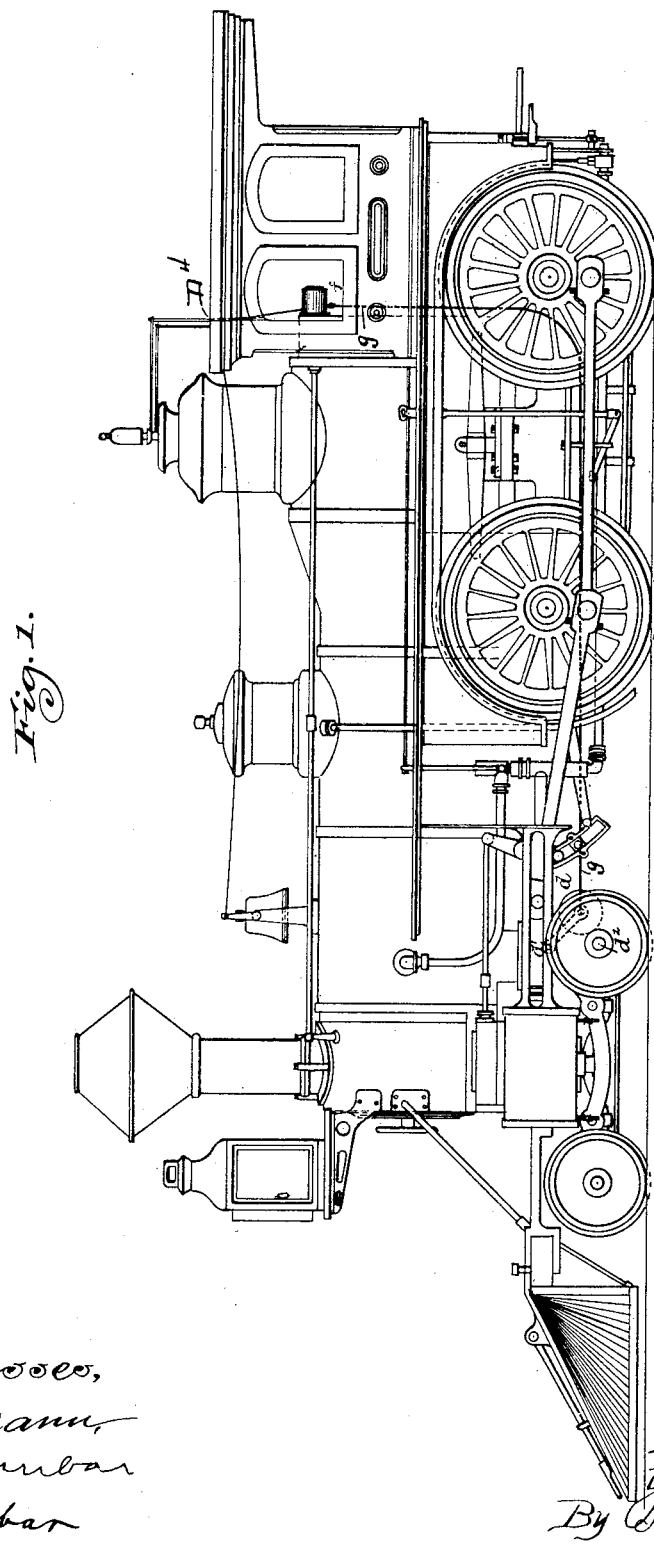
Figure 4:
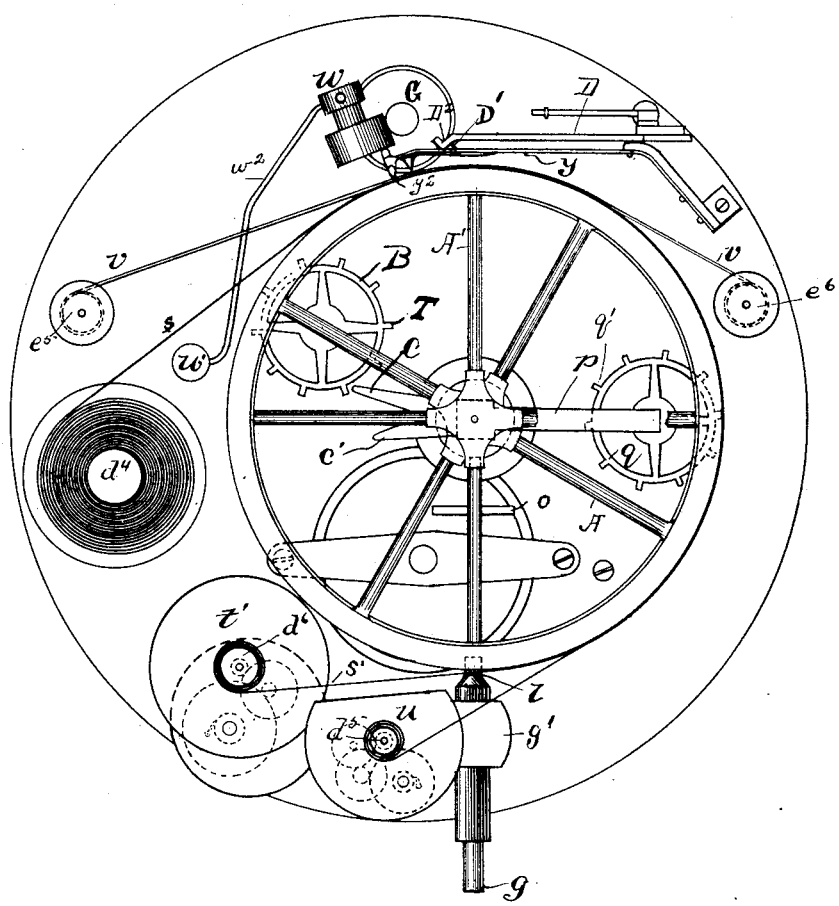

In the accompanying drawings, Figure 1 is a view in side elevation of a locomotive, showing my improvement applied thereto. Fig. 2 is a front view of the device, showing the clock-dial. Fig. 3 is a plan view of the indicating apparatus, the casing being removed, showing the clock-movement and the recording devices. Fig. 4 is a view in end elevation of the apparatus, showing the recording mechanism. Fig. 5 is a view of the two recording-drums and also the pinion and shaft actuating one of said drums. Fig. 6 shows the record as it appears on the tapes. Fig. 7 is a plan view of the marking device. Fig. 8 is a detail view of the wheel $q$, the spring supporting the same, and the deflector $o$, shown in in Fig. 5; and Fig. 9 is a view in end elevation from the side opposite that shown in Fig. 5, showing the two drums, the paper strips, ink-tape, and marking-points, roller, and hammer.

The apparatus consists, primarily, of two drums, one of which is actuated by the clock-train and the other by the revolution of one of the axles of the locomotive. Both drums are provided on their peripheries with characters or marks, the characters or marks on the drum actuated by the clock adapted to indicate hours, minutes, and seconds, while the characters or marks on the drum actuated by the travel of the locomotive indicate miles and fractions of a mile. Over these two drums pass strips of paper, and over the latter is an inking-tape, which tape when forced down on the paper strips forces the latter in contact with the characters of both wheels and permanently records thereon the characters immediately beneath the tape. The clock-train can be of any approved construction, and, as shown in Fig. 3, is provided at the inner end of the sleeve carrying the minute-hand with a small pinion $a$, which latter gears with the pinion $a'$, (shown in dotted lines, Fig. 3,) fast on the post carrying the drums A A'. The wheels $a$ $a'$ are of the same size, and hence it will be seen that the shaft or post $b$, carrying the drums A A', (see Fig. 5,) revolves once with each revolution of the sleeve on the center-post of the clock-train, or, in other words, makes one complete revolution every hour. The periphery of this drum A is provided with a series of short lines, each line representing one second. This drum A is fast on the post $b$ and is provided with the hour-indicating wheel B, mounted on a bearing attached to one of the radial arms of the drum. This hour-wheel B is provided with twelve teeth or projections T, each having thereon a figure and numbered from "1" to "12," inclusive. This wheel is yieldingly held against accidental rotation by frictional contact, and at each revolution of the drum it is turned one-twelfth revolution by the projection $c$, (see Fig. 4,) rigidly held in a position to engage the projections T as the drum is revolved.

The drum A' (see Fig. 5) is provided on its periphery with equidistant parallel lines, the space between each two lines representing the fraction of a mile—as, for example, a rod—and on its side edge or front face with small teeth adapted to be engaged by the small pivoted pinion $l$ on the end of the shaft $g$. This shaft $g$ is supported at its upper end in a bearing $g'$, the latter being fast to a post $g^2$. (See Fig. 5.) This post $g^2$ is seated in the block $h$, rigidly secured to the casing of the indicator, and is adjusted therein by means of the set-screw $k$. If for any reason it should be desired to disengage the pinion $l$ and drum A', it can be done by simply loosening the set-screw $k$ and pushing the post $g^2$ forwardly until the teeth of the two parts are disengaged. This shaft $g$, as shown in Fig. 1, extends forwardly and is connected by worm-gearing (not shown) to the friction-wheel $d$, which latter rests in contact with the axle $d^2$. The shaft $g$ can be coupled by knuckle or other joints, and is preferably provided at the point $f$ (see Fig. 1) with a flexible section, which latter absorbs the jar and shock. This shaft, instead of running to one of the forward axles, could, as clearly shown in Fig. 1, be perfectly straight and receive its motion from the axle of the rear driving-wheel. The friction-wheel $d$ is preferably mounted in links $d'$, so as to accommodate itself to the movement of the axle. This shaft $g$ communicates motion to drum A', loose on shaft $b$, and hence is only rotated while the engine is in motion. Secured to the hub of drum A', so as to rotate therewith, is the spring arm $p$, (see Figs. 5 and 8,) carrying at its outer free end the small wheel $q$. This wheel is provided on its periphery with ten projections $q'$, each having thereon a number, the several projections being numbered from "1" to "10," inclusive. This arm carrying the wheel $q$ moves with the drum A' and at each complete revolution of the drum a projection $q'$ of said wheel is struck by the stationary projections $c'$ (see Fig. 4) and turned a distance equal to one tooth or projection. The drum is geared up to make one revolution each mile. Hence the wheel $q$ makes one complete revolution every ten miles. Referring again to Fig. 5, it will be seen that devices of some kind are necessary for holding the wheel $q$ out of contact with the pinion $l$ as the wheel approaches the pinion. This is accomplished by the bracket $n$, rigidly secured to support $n'$ and provided at its free end with the double-inclined arms $o$. The spring-arm $p$ is provided on its front face with the lip $o'$, and as the spring-arm $p$ approaches pinion $l$ the lip $o'$ engages one end of arm $o$ and gradually draws the arm, with the wheel $q$ thereon, away from the pinion $l$ and after the wheel has passed said pinion $l$ gradually allows the wheel to resume its normal position adjacent to the drum A'.

Loosely mounted on a stud $d^4$ are two spools, each carrying a paper ribbon $s\ s'$. The free ends of these ribbons are attached to stems $d^5\ d^6$, and the slack is taken up by suitable trains of wheels, mounted, respectively, in the casings $u$ and $t'$. The ribbon $s$ passes over the outer or time drum A, while the ribbon $s'$ passes around drum A'. Located above the ribbons is the inking-tape $v$, rolled at its end around rollers $e^5\ e^6$, which latter are preferably caused to rotate slowly, so as to constantly present a fresh ink-surface to the ribbons immediately below the same. Located over the ribbon is the spring-arm $y$, provided with a series of marking-points, to be hereinafter described. This spring-arm $y$, as clearly shown in Fig. 7, is also provided near its free end with a tongue $y'$ formed by slotting the spring-arm, the free end of this tongue forming two marking-points, as at $y^2$, (see Fig. 9,) while two other marking-points $y^3$ and $y^4$ on arm $y$, located, respectively, on opposite sides of the marking-points $y^2$, mark or impress every stroke of hammer $w$ on both ribbons. The tongue $y'$ (see Fig. 7) is provided on its upper surface with a wedge-shaped cam D'. This spring $y$ normally holds the marking-points $y^2$ on the tongue $y'$ out of contact with the tape and ribbon, and hence when the point $y^2$ is in its normal or elevated position the paper passes under same and under the other marking-points $y^3$ and $y^4$ without receiving impressions corresponding to the characters on the drums immediately below these points.

$w$ is a hammer located immediately over the free end of the spring $y$ and adapted to strike the free end of this spring and force the ink-tape in contact with the paper and the latter in contact with the drums once every six seconds. This hammer is mounted on the handle $w^2$, which latter is rigidly secured to the post $w'$. This post $w'$ is provided at a point behind the plate $w^3$ with a stud $w^4$, (see Fig. 3,) which latter engages pins $w^5$, fixed to wheel $w^6$. This wheel $w^6$ makes one revolution a minute, and, being provided with ten stops $w^5$, it necessarily actuates the post $w'$ and the hammer carried thereby once every six seconds.

For the purposes of illustration we will suppose the car to be in motion and both drums A A' revolving, the former by the clock-train and the latter by the shaft $g$, the ribbon being unwound from the two spools on stem $d^4$ and wound on the spools carried by stems $d^5$ and $d^6$. When the free end of the spring $y$ is elevated, the paper passes under the inking-ribbon without receiving any impression. Every six seconds, however, the hammer is tripped, and, falling on the free end of spring $y$, carrying the marking-points $y^2$, $y^3$, and $y^4$, forces the ink-tape in contact with the paper ribbons and the latter against the characters on the peripheries of the drums, thus imprinting on the paper strips the corresponding characters on the drums. As the speed-drum A' is governed by the speed of the train and the drum A governed by the clock-train, it follows that the impression made on both strips by the marking-points on spring $y$ will indicate the speed of the train and any variations in the speed.

To indicate the time the whistle was blown and the length of time the whistle was open, I have provided a slide D. (See Figs. 3 and 7.) This slide D is connected through the intervention of the bell-crank lever $D^3$ and rod $D^4$ with the whistle-actuating devices, and hence every time the whistle is blown the plate D is moved toward the free end of spring $y$. As before stated, the tongue $y'$ of spring $y$ is provided with a double cam $D'$. The plate D is also provided with a double cam $D^2$, adapted to engage cam $D'$ first when moving from the right toward the left and again while moving from the left toward the right; or, in other words, it engages cam $D'$ at the instant the whistle is opened and again the instant the whistle is closed by the release of the whistle-actuating cord. Each time the cam $D^2$ engages the cam $D'$ it forces the marking-points $y^2$ on tongue $y'$ down in contact with the inking-ribbon $v$ and forces the latter, together with the paper, in contact with the adjacent edges of the peripheries of the drums A A', thus making two distinct impressions on the ribbon—such, for instance, as shown at $f^3 f^3 f^4 f^4$ in Fig. 6.

The equidistant parallel lines on the strip $s'$ are caused by roller G (see Fig. 4) bearing constantly on the inking tape and ribbon $s'$.

From the foregoing it will be seen that an impression is made on the ribbon $s$ every six seconds, and each hour is indicated on the strip by a numeral made by pressing the paper in contact with one of the teeth T of wheel B, while the ribbon $s'$ on the drum A' revolves only when the locomotive is running. As before stated, each fraction of a mile—such, for instance, as a rod—traveled is indicated by a straight line $y^6$, (see Fig. 6,) caused by the roller G holding the paper and the inking-tape in contact with the drum A', and the miles traversed are indicated by the numerals on wheel $q$, which, as already stated, makes one complete revolution every ten miles.

The object of employing the wheels B and $q$ is simply to facilitate calculating the time consumed on the road and the number of miles and fractions thereof traveled, and thus avoid the necessity of counting the distance by rods and the time by seconds.

While the train is standing still no record is made upon the motion-recording ribbon $s$ because no motion is transmitted to the mileage-recording ribbon $s'$. The record upon the time-recording ribbon $s$, however, is made continuously in the manner above described.

For greater convenience in reading this record the periphery of the time-recording drum A is divided, as shown in Fig. 5, into several sections parallel with the plane of the drum. Extending from section H in a diagonal direction across the surface of the drum is a series of short lines. The first one, counting from section H, represents the first ten seconds of the minute, the second short line the second ten seconds of the minute, and so on up to the sixth short line, when the next blow of the hammer strikes over the short line in the section next to section H. Thus each stroke of the hammer on the marking-points makes a short line upon the paper tape, the location of the short line with reference to a point upon the edge of the paper tape determining its value in each minute, and each diagonal row of dots representing one minute. The record of the hour is made upon the paper tape by means of the wheel B, which once each hour presents a tooth T beneath the marking-point, which is pressed upon it by the stroke of the hammer $w$. The record of the hour is made at the extreme edge of the paper tape, leaving between the hour and the diagonal dotted minute and ten-seconds record a space in which the whistle-sounding register is made. This is the space H on the drum corresponding to space N on the tape.

The mileage-record drum A' is divided into three sections parallel with the plane of the drum, as shown in Fig. 5. Space I is the one in which the whistle-sounding record is made by marking-points $y^2$. In J is recorded the blows of the hammer, and on K roller G presses continuously, making a record of parallel lines, preferably representing rods, as already set forth. At each revolution of the mileage-recording drum A' the wheel $q$ presents one of the ten projections $q'$ on its periphery opposite the roller, which presses the paper tape against the inking-ribbon, and this projection makes a record preferably representing miles. It is obvious that upon the projections of both wheels B and $q$ numbers may be engraved from "1" up, thus enabling the record to be more easily read. Wheel $q$ rests against the side of drum A', except at the point where it passes gear-wheel $l$, as already described.

I will now proceed to describe the record as it appears upon the paper tapes. I will first say that I have arranged my device so that the spools of blank paper ribbon can be readily put in position, and the spools upon which the paper ribbon is wound can be removed. This change is made, preferably, at the end of each division of the road.

Considering first the record made by the time-recording wheel A, it is apparent from the foregoing description that each of the hammer-strokes will be recorded by one six-second short line. These short lines take up the divisions represented by M in Fig. 6, thus leaving two divisions N and O blank, except as hereinbefore stated. When wheel B presents one of its projections T beneath the marking-point, a record is made in section O, as shown in Fig. 6 by the small figure "1" in the time-recording ribbon. Space N on this tape is still blank until the whistle-valve is opened and closed, when the record is made, as already described and as shown by the marks in sections N and R in Fig. 6. Supposing the ribbon to have been moving in the direction indicated by the arrows, the record, so far as the time is concerned, would show that the whistle had started to sound at ten seconds past the hour and had continued to sound for one minute and about five seconds.

Now consider the mileage-record wheel A'. Supposing that the train is in motion, the paper ribbon will pass in the direction indicated by the arrow, and, as before described, the roller G will make a series of lines. (Shown in section P, Fig. 6.) No record will be made in section Q, except when at each revolution of drum A' the wheel $q$ presents a projection $q'$, against which the roller presses the paper ribbon, as already described, thus making the mark shown by small figure "1" in section Q, Fig. 6. A part of the marking-point which records the hammer strokes extends over the mileage-recording ribbon, and thus the six-seconds blows are recorded in section S. It is at once apparent that the distance apart of the marks in section R, compared with the number which is shown in Fig. 6, would be at the rate of about thirty rods in ten seconds. There is still left section R, in which the whistle-sounding record is made in the manner already described, thus showing at what point on the road the whistle began to sound and also where it ceased sounding. Thus a permanent record is made, which can be kept as long as desired, first, of the speed of the train at any and all times and places; second, of the length of time the train stands still and the place on the road where it thus stood; third, of the time when the whistle-valve is opened and when it is closed, and, fourth, of the point on the road where the whistle-valve is opened and closed.

Having thus described my invention, what I claim as new, and desire to secure by Letters Patent, is—

1. The combination, with a clock-train and two wheels, one actuated by the clock-train and the other by the travel of the locomotive, of two ribbons, one passing over each wheel, a marking-point resting over both ribbons, and a device actuated at regular intervals by the clock-train for forcing the marking-point toward the ribbon, substantially as set forth.

2. The combination, with a clock-train and two ribbons, one moved longitudinally by the clock-train and suitable feeding mechanism and the other by devices actuated by an axle of the locomotive, of a marking-point resting over both ribbons and a device actuated by the clock-train for forcing said marking-point toward the ribbons, substantially as set forth.

3. The combination, with a clock-train and two wheels, one actuated by the clock-train and the other by the travel of the locomotive, of two ribbons, one passing over each wheel, a marking-point adapted to make an impression on both ribbons, and a device connecting such marking-point and the whistle-actuating devices, substantially as set forth.

4. The combination, with a clock-train and two ribbons, one actuated by the clock-train and the other by devices connecting it with a car-axle, of a device actuated by the whistle-operating devices for forcing the marking-point toward the ribbons and making impressions thereon, substantially as set forth.

5. The combination, with a wheel having characters on its periphery, devices for actuating said wheel by the travel of the locomotive, a second wheel having characters on its periphery, and a clock-train for actuating said latter wheel, of a ribbon passing over each wheel and a marking-point adapted to strike the ribbons intermittingly and impress thereon the characters immediately below the marking-point, substantially as set forth.

6. The combination, with a wheel actuated by the travel of the locomotive, a time-train, and a wheel actuated by the time-train, both wheels having characters on their periperies, and ribbons resting on said wheels and adapted to move therewith, of a roller for holding a portion of one ribbon continuously in contact with the periphery of its wheel and an intermittingly-actuated marking point adapted to force both ribbons into contact with their respective wheels, substantially as set forth.

7. The combination, with a clock-train and two ribbons, one actuated by the travel of the locomotive and the other by the clock-train, of devices for marking the distance traveled on one ribbon and devices for marking intervals of time on both ribbons.

8. The combination, with a clock-train and two wheels, one actuated by the travel of the locomotive and provided with characters, each character representing a mile or fraction of a mile, and the second wheel actuated by the clock-train and provided with characters each representing a fraction of an hour, of a ribbon for each wheel, and means for impressing on one ribbon the characters representing a mile or fraction thereof, and devices for making impressions on both ribbons at regular intervals of time, substantially as set forth.

9. The combination, with a clock-train, two wheels, one actuated by the travel of the locomotive and the other by the clock-train, and a ribbon passing over each wheel, of devices for making impressions on both ribbons at regular intervals of time and devices for making impressions on both ribbons every time the whistle is opened and closed, substantially as set forth.

10. The combination, with a clock-train and two independent ribbons, one moved by the travel of the locomotive and the other by the clock-train, of devices for marking on one ribbon characters representing the miles and fractions of a mile traveled and devices for marking characters on both ribbons at regular intervals of time, substantially as set forth.

11. The combination, with a clock-train and two independent ribbons, one actuated by the travel of the locomotive and the other by the clock-train, of devices for marking on one ribbon characters representing miles and fractions of miles traveled and devices for imprinting characters on both ribbons, each of the latter characters representing a fraction of an hour.

12. The combination, with a clock-train and two ribbons free to move at unequal speeds, one ribbon actuated by the travel of the locomotive and the other by the clock-train, of means for imprinting on one ribbon characters each representing the fraction of a mile, devices actuated by the clockwork for imprinting on both ribbons characters each representing a fraction of an hour, and a device connected to the whistle-blowing mechanism and adapted to make impressions on both ribbons every time the whistle is opened and closed, substantially as set forth.

In witness whereof I hereunto subscribe my name this 11th day of August, A. D. 1891.

BENJAMIN F. STOCKFORD.

Witnesses:
   A. S. DUNBAR,
   GEORGE L. CRAGG,
   ROBIN E. DUNBAR.